United States Patent
Peschansky et al.

(10) Patent No.: US 10,218,813 B2
(45) Date of Patent: Feb. 26, 2019

(54) AUTOMATIC SURGE PROTECTION OF SYSTEM RESOURCES

(71) Applicant: salesforce.com, inc., San Francisco, CA (US)

(72) Inventors: Olga Peschansky, Castro Valley, CA (US); Sreeram Duvur, Fremont, CA (US); Travis Downs, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 198 days.

(21) Appl. No.: 15/420,226

(22) Filed: Jan. 31, 2017

(65) Prior Publication Data
US 2018/0219968 A1   Aug. 2, 2018

(51) Int. Cl.
*H04L 29/08* (2006.01)
*H04L 29/06* (2006.01)

(52) U.S. Cl.
CPC .......... *H04L 67/32* (2013.01); *H04L 65/1063* (2013.01)

(58) Field of Classification Search
CPC . H04L 65/1063; H04L 65/1069; H04L 67/32; G06F 17/3089
USPC ....................................................... 709/226
See application file for complete search history.

(56) References Cited

U.S. PATENT DOCUMENTS

| | | | |
|---|---|---|---|
| 7,954,105 B2 | 5/2011 | Taniguchi et al. | |
| 8,225,321 B2 | 7/2012 | Johnson | |
| 8,572,620 B2 | 10/2013 | Hundscheidt et al. | |
| 8,677,370 B2 * | 3/2014 | Haenel ............... | G06F 11/3409 718/104 |
| 9,003,019 B1 * | 4/2015 | Guo ....................... | G06Q 10/10 370/352 |
| 9,497,136 B1 * | 11/2016 | Ramarao ............ | G06F 9/45558 |
| 9,830,566 B1 * | 11/2017 | Dailianas ........... | G06Q 10/0631 |
| 2006/0277307 A1 * | 12/2006 | Bernardin .............. | H04L 67/02 709/226 |
| 2009/0182605 A1 * | 7/2009 | Lappas .................. | G06Q 10/06 705/34 |
| 2014/0075030 A1 * | 3/2014 | Wang ........................ | G06F 9/50 709/226 |
| 2017/0180947 A1 * | 6/2017 | Shafi ....................... | H04W 4/04 |

* cited by examiner

*Primary Examiner* — Ruolei Zong
(74) *Attorney, Agent, or Firm* — Meyertons, Hood, Kivlin, Kowert & Goetzel, P.C.

(57) ABSTRACT

A method for the managing access to a software resource is disclosed. The method may include receiving, from a particular consumer, a request for a number of permits corresponding to units of a software resource. The numbers of permits may be compared to a total number of available permits. In response to determining that the number of permits is greater than the total number of available permits, rejecting the request in response to determining the number of permits requested is within a threshold value of permits requested by another consumer who has requested the largest number of permits in a preceding time period.

20 Claims, 7 Drawing Sheets

AUTOMATIC SURGE PROTECTION OF SYSTEM RESOURCES

BACKGROUND

Technical Field

This disclosure relates to the operation of a computing system and more specifically to resource allocation.

Description of the Related Art

Computer systems may include multiple computers, workstations, servers, and storage systems, each performing different tasks. For example, in some computer systems, a particular computer may be executing software for managing e-mail messages, while other workstations, in the computer systems, may be used for word processing, web browsing, and the like.

In some cases, resources of the computer system may be shared by different applications or software programs being executed by various computers, workstations, included in the computer system. Such resources may include both hardware and software resources. For example, in some computer systems, a disk storage unit may be a hardware resource that is shared between multiple computers or workstations.

Shared software resources may include software program instructions, or log files, and the like, and may be accessed by multiple computers or workstations. In some cases, different software programs or applications may access a shared software resource. Such software programs or applications may be executed on a single computer or workstation, or they may be executed on different computers or workstations.

Figure 1:
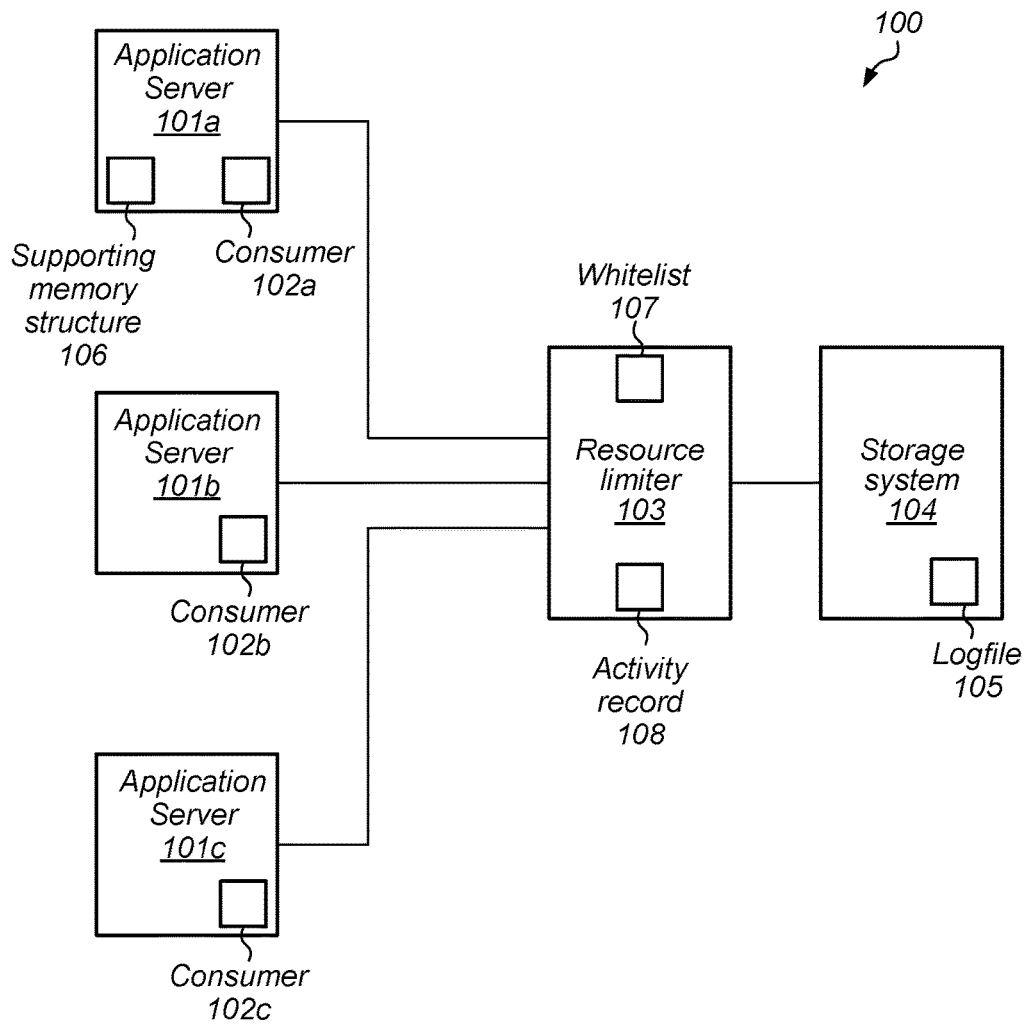
FIG. 1 is a block diagram of resource usage in a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

In computer systems, various hardware and software resources may be shared by different consumers. As used and defined herein, a consumer references to a particular piece of computer hardware, or a software program or application, which generates requests to access a system resource during operation. In some cases, a particular resource, either hardware or software, may be accessed by a large number of consumers during operation of the computer system.

Different consumers may have different patterns of consumption at different times. For example, during business hours, there may be a large number of requests to write to a log file by various consumers, while after hours, such requests may dwindle. If a particular consumer is allowed unrestricted access to the resource, periods of high use by the particular consumer may overwhelm the resource, possibly resulting in a loss of information or system performance. The embodiments illustrated in the drawings and described below may provide techniques for imposing an upper limit on a total amount of a resource consumed over a period of time in an equitable manner amongst the various consumers within a computer system.

A block diagram of an embodiment of a computer system is illustrated in FIG. 1. In the illustrated embodiment, computer system 100 includes application servers 101a-c, resource limiter 103, and storage system 104.

Each of application servers 101a-c may, in various embodiments, correspond to a computer, workstation, or any suitable computing hardware. Application servers 101a-c may execute one or more software programs or applications during operation. In various embodiments, application servers 101a-c may include consumers 102a-c, respectively. During operation, each of consumers 102a-c may generate requests for access to a particular resource in computer system 100. For example, consumers 102a-c may generate data to be stored in logfile 105. As the data is generated, each of consumers 102a-c may send a request to resource limiter 103 for access to logfile 105. In various embodiments, such requests may include a requested amount, e.g., characters, of logfile 105 to be allocated.

Resource limiter 103 may be a particular embodiment of a software program or application being executed on a processor or processor core. Although depicted as being independent of application servers 101a-c, in some embodiments, resource limiter 103 may be executed on one of application servers 101a-c, or on a dedicated computer or workstation associated with storage system 104.

As described below in more detail, resource limiter 103 may receive requests for access to system resources, such as, e.g., logfile 105 stored on storage system 104, from consumers 102a-c. As requests for access to logfile are received by resource limiter 103, information indicative of a time when the request was received, along with an amount (also referred to as "units") of the resource may be stored by resource limiter 103 in activity record 108 on a per consumer basis.

In order to determine if a request from a particular one of consumers 102a-c is to be granted or rejected, resource limiter 103 may access a list, such as whitelist 107, of consumers with unrestricted access to a given resource included in computer system 100. Although a single whitelist is depicted in the embodiment of FIG. 1, in other embodiments, different numbers of whitelists may be employed, each corresponding to a particular resource.

In other embodiments, resource limiter 103 may determine an amount of available storage in supporting memory structure 106. Based on the amount of available storage in supporting memory structure 106, resource limiter 103 may determine whether a given resource request from a particular one of consumers 102a-c is granted or rejected. Although supporting memory structure 106 is depicted as being included in application server 101, in other embodiments, supporting memory structure 106 may be included in any suitable application server. It is noted that although only a single supporting memory structure is depicted in the embodiment of FIG. 1, in some embodiments, resource limited 103 may use any suitable number of supporting memory structures.

Storage system 104 may be any suitable combination of physical memory or other mass storage devices. For example, storage system 104 may include Dynamic Random Access Memory (DRAM), a Static Random Access Memory (SRAM), a Read-only Memory (ROM), Electrically Erasable Programmable Read-only Memory (EEPROM), or a non-volatile memory (NVM, including NVDIMM technology), for example. Alternatively, storage system 104 may include multiple hard-disk drives, solid-state drives, or any other suitable mass storage device. Although a single storage system is depicted in the embodiment of FIG. 1, in other embodiments, any suitable number of storage systems may be employed.

It is noted that the embodiment illustrated in FIG. 1 is merely an example. In other embodiments, computer system 100 may include other types of computer hardware and storage systems.

Figure 2:
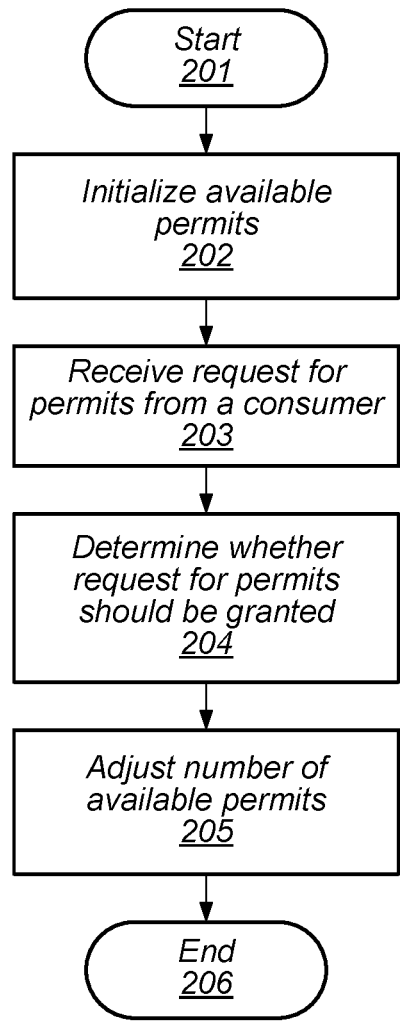
FIG. 2 illustrates a flow diagram depicting an embodiment of a method for limiting resource usage in a computer system.

Turning to FIG. 2, a flow diagram depicting an embodiment of a method for managing access to a software resource is illustrated. Referring collectively to the embodiment of FIG. 1 and the flow diagram of FIG. 2, the method begins in block 201.

Resource limiter 103 may then initialize a number of available permits (block 202). In various embodiments, a permit may correspond to a unit of a particular resource of a computer system. As used and described herein a unit of a particular resource (or "resource unit") is a unit of capacity associated with the particular resource. For example, in some cases a resource unit may correspond to a single character in a log or data file, while in other cases, a resource unit may correspond to an amount of data transferred over a network. In some embodiments, the initial number of permits may be a configurable parameter that may be adjusted based on system performance or any other suitable metric associated with the computer system.

Resource limiter 103 may then receive a request for a number of permits from a consumer, such as, consumer 102a, for example (block 203). In various embodiments, the number of permits corresponds to a number of units of a resource that consumer 102a desires to access. For example, in some cases, consumer 102a may request a number of permits from resource limiter 103 in order to write a corresponding amount of data to logfile 105.

Once the request for permits has been received, resource limiter 103 may determine whether to grant the requested permits (block 204). As described below in more detail, resource limiter 103 may check how many permits consumer 102a has been granted in a previous time period, and compare that number of granted permits to numbers of permits granted to other consumers. In the case where the requested permits are granted, the activity record of consumer 102a, such as, e.g., activity records 108, is updated to reflect the granted permits by adding a datapoint.

Resource limiter 103 may then adjust the number of available permits (block 205). In various embodiments, resource limiter 103 may increment the available permits by a particular number of permits after a given time period has elapsed, and in the event of a granting of permits, resource limiter 103 may decrement the number of available permits by the number of granted permits. The particular number of permits may, in some embodiments, be a configurable parameter that may be adjusted to allow for different resource usage in the computer system. For example, in the case of logging activity, the rate of logging may be high during business hours, and may be lower at night. The method may then conclude in block 206.

It is noted that the embodiment depicted in the flow diagram of FIG. 2 is merely an example. In other embodiments, different operations and different orders of operations are possible and contemplated.

Figure 3:
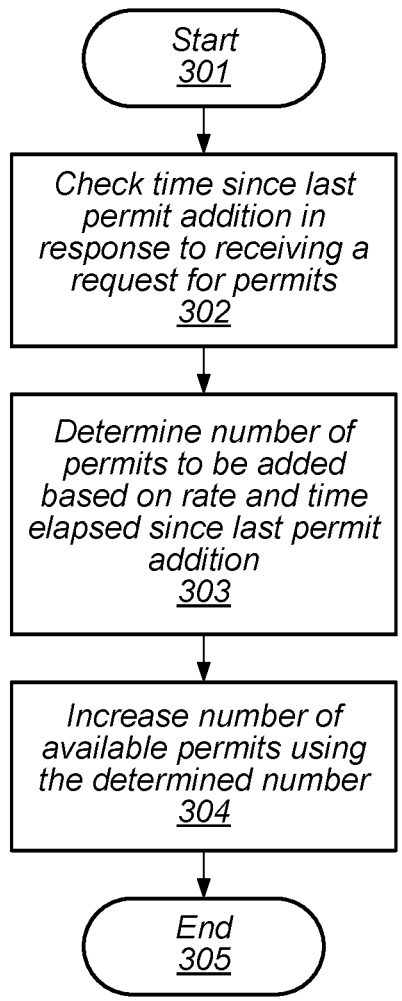
FIG. 3 illustrates a flow diagram depicting an embodiment of a method for modifying a number of available permits over time.

As previously mentioned a resource limiter, such as, e.g., resource limiter 103, may adjust the number of available permits in response to various time periods elapsing. A flow diagram depicting an embodiment of a method for adjusting the available permits is illustrated in FIG. 3. In various embodiments, the embodiment of the method depicted in the flow diagram of FIG. 3, may correspond to block 205 of the flow diagram illustrated in FIG. 2. The method begins in block 301.

Resource limiter 103 may then check, in response to receiving a request for permits, the time elapsed since permits were added to the pool of available permits (block 302). For example, in response to receiving a request for permits from consumer 102a, resource limited 103 may determine that a particular period of time has elapsed since the number of permits in the pool of available permits has been increased.

Resource limiter 103 may then determine the number of permits to be added to the pool of available permits (block 303). In various embodiments, the number of permits added to the pool of available permits may be dependent upon a rate of permit addition and the elapsed time. Such an amount may be configurable, and may depend on parameters of the resource associated with the permits. For example, in the case of logging, a maximum size of a log file may be used, in part, to determine rate of permit addition. Alternatively, a history of resource consumption may be examined and, based on results of the examination, the rate for permit addition to the pool of available permits may be determined. The number of available permits may then be increased using the determined number of permits to add (block 304).

If the rate at which permits are being added to the number of available permits is greater than the rate at which permits are being consumed, then permits may be available for future requests. Alternatively, if permits are being consumed at a greater rate than they are being replenished, then the resource limiter may operate at a deficit.

In some cases, resource limiter 103 may borrow against future permits to allow requests for permits to be granted even when no permits are available. By allowing for borrowing against future permits, resource limiter 103 may, in various embodiments, compensate for uneven resource usage. Once the number of available permits has been increased, the method may conclude in block 305.

It is noted that the embodiment depicted in FIG. 3 is merely an example. In other embodiments, different operations and different arrangements of operations may be employed.

Figure 4:
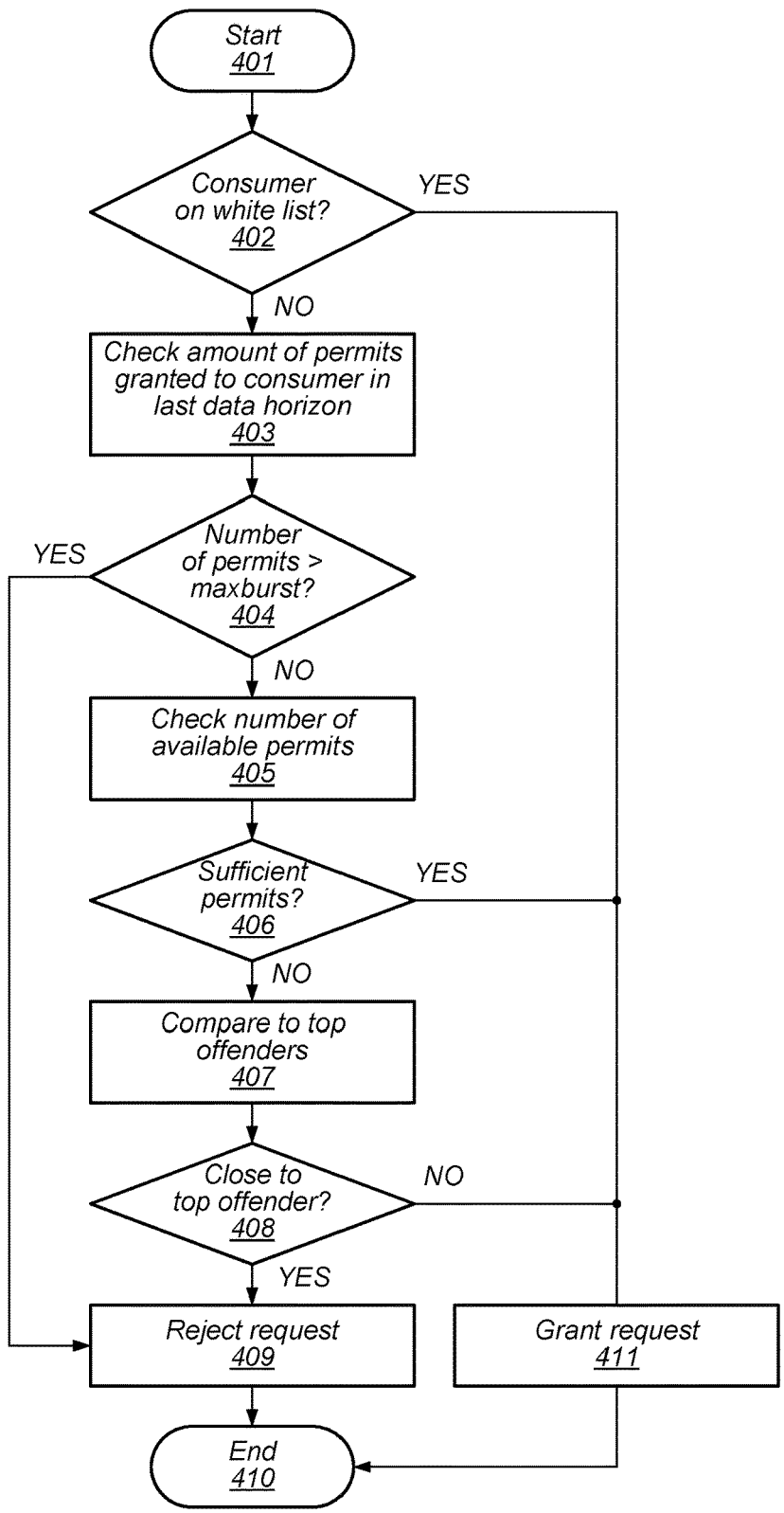
FIG. 4 illustrates a flow diagram depicting an embodiment of a method for processing requests for permits for a particular resource in a computer system.

Turning to FIG. 4, a flow diagram depicting an embodiment of a method for processing permit requests is illustrated. In various embodiments, the embodiment depicted in the flow diagram of FIG. 4 may correspond to block 204 of the flow diagram of FIG. 2. The method begins in block 401, and may then depend on if the consumer that generated the permit request is one a white list (block 402).

In various embodiments, some resource consumers are important to the overall computer system, and as such, must be allowed to access resources independent of whether or not there is a deficit of permits. For example, a consumer that reports internal errors, or print customer receipts may be allowed access to desired resources, even if there are insufficient permits to access the desired resources. A list of such consumers may be stored in the white list. If the consumer that generated the request for permits is included in the white list, then the request for permits is granted (block 411), and the method may conclude in block 410.

Alternatively, the consumer that generated the request is not included in the white list, then a number of permits granted to the consumer during the last data horizon is checked (block 403). As used and described herein a data horizon (or "data horizon window") is a period of time during which requests for permits are tracked for each consumer, and activity older than data horizon may be purged. The duration of the data horizon may, in various embodiments, be configurable.

The use of a data horizon focuses the resource limiting operations on the recent past, thereby allowing the choice of which requests for permits to grant and which to reject based on recent activity. The use of recent activity data may be useful in dynamic software systems. For example, if a computer system experiences a network connectivity problem, number time-out messages may be generated. When the connectivity problem is resolved, the number of time-out messages will drop. It is, therefore, desirable to discard the high number of time-out messages after a period of time and not penalized future requests of the particular consumer that was logging the time-out messages. Additionally, by discarding activity data older than the data horizon, an amount of storage for maintaining the activity data is reduced, and the amount of time and computing resources to perform calculations using the activity data is also reduced. The method may then depend on the amount of permits granted (block 404).

If the number of permits granted to the consumer during the last data horizon is greater than a threshold value for a maximum burst then the request for permits is rejected (block 409). In some cases, a consumer may use a resource at a high rate due to system problem, such as, loss of network connectivity, for example. Logging messages relating to such a situation can put a strain on the logging system, and saving numerous messages relating to the problem offers little additional information.

To limit such strain, the number of permits granted to a consumer may be checked against a configurable parameter indicating a maximum burst of resource requests. If a consumer has received permits in the last data horizon window that exceed the maximum burst value, then the request for additional permits may be rejected until the number of granted permits fall below the maximum burst parameter. Once the request has been rejected, the method may conclude in block 410.

If the number of permits granted to the consumer in the last data horizon window is below the threshold value, then a number of available permits for the desired resource is checked (block 405). The method may then depend on the number of available permits (block 406).

In the case where the number of available permits is greater than the requested number of permits, then the method may continue from block 411 as described above. Alternatively, if the number of available permits is less than the requested number of permits, then the activity of the consumer may be compared to other consumers with high resource usage (block 407).

As described below in more detail in regard to FIG. 5, during operation of the computer system, a list of consumers that have the highest use of a resource is maintained. The consumers included on this list are commonly referred to as "top offenders." The number of permits requested by the consumer may be compared to the other consumers identified as top offenders. The method may then depend on results of the comparison (block 408).

If the number of permits granted to the consumer is within a threshold value of the number of permits granted to the highest-ranking offender in the top offender list during the last data horizon window, then the request is rejected, and the method may proceed from block 409 as described above. Otherwise, the request is granted, and the method may proceed from block 411 as described above.

Although the operations included in the flow diagram of FIG. 4 are depicted as being performed in a sequential fashion, in other embodiments, one or more of the operations may be performed in parallel.

As described above, when there are insufficient permits to satisfy a consumer's request, the activity of the consumer is compared to the activity of consumers on the top offenders lists. A flow diagram depicting an embodiment of a method for performing such a comparison is illustrated in FIG. 5. The method begins in block 501.

The number of permits the granted to the consumer during the last data horizon may then be determined (block 502). In various embodiments, the activity record associated with the consumer includes an entry that stores a value indicative of a total of permits successfully obtained by the consumer during the last data horizon. During operation, adding to the total when a new data point is inserted, and subtracting from the total when an old data point is purged may update the value.

The number of permits granted to the consumer may then be compared to the number of permits granted to the consumers on the top offenders lists (block 503). As different consumers make requests for permits, the members of the list are continually updated. In various embodiments, the number of consumers included in the list may be programmable. In some embodiments, the number of permits granted to the consumer in the last data horizon is compared to the number of permits last granted to a highest-ranking offender in the top offender list, i.e., the consumer that had the largest number of granted permits during the last data horizon. The method may then depend on a result of the comparison (block 504).

If the number of permits granted to the consumer is not within a threshold value of the number of permits granted to consumers included in the top offender list, the method may conclude in block 506. Alternatively, if the number of permits granted to the consumer is within a threshold value of the number of permits granted to the consumers included in the top offenders list, the consumer may be added to the list (block 505). In some embodiments, the addition of the consumer to the top offender list may also be based on a number of consumers currently included in the top offenders list, as well as a maximum number of consumers that may be included in the top offenders list. Once the consumer has been added to the top offender list, method may conclude in block 506.

Figure 5:
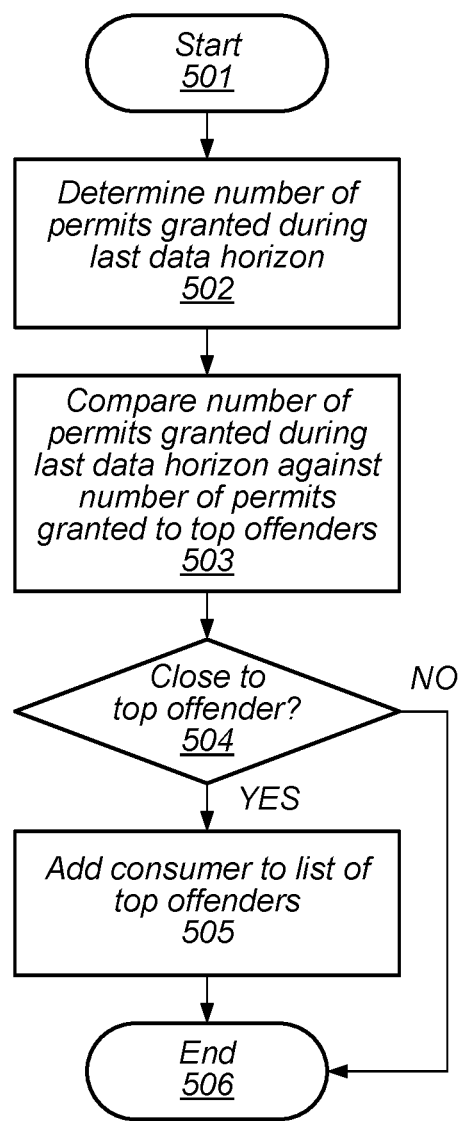
FIG. 5 illustrates a flow diagram depicting an embodiment of a method for comparing resource usage of a particular consumer to other consumers.

It is noted that the embodiment of the method depicted in the flow diagram of FIG. 5 is merely an example. Different operations and different orders of operations may be possible, in other embodiments.

In the description above, a resource limiter rejects a request for permits from a consumer in response to a determination that the number of available permits is less than the requested number of permits. The concept of rejecting access to a resource may be further extended to other conditions related to the resource that may put stress on the computer system. An embodiment of method of a resource limiter limiting access to a resource using an alternative condition is depicted in the flow diagram illustrated in FIG. 6. Referring collectively to the embodiment of FIG. 1, and the flow diagram of FIG. 6, the method begins in block 601.

In response to a request for permits, the activity record for the consumer may be updated (block 602). In various embodiments, data points that fall outside of the data horizon may be removed during the update of the activity record. Once the update of the consumer's activity record has been completed, resource limiter 103 may then determine the number of permits granted to the consumer during the last data horizon (block 603).

Resource limiter 103 may also check memory structure 106 (block 604). In some embodiments, memory structure 106 may be used to temporarily store data before it is written to storage. For example, when storing data to a file in an application such as logging, the data to be logged may be temporarily stored in a memory structure included in the physical memory of the computer system. The method may then depend on the usage of memory structure 106 (block 605).

In some cases, the memory structure can be full or have limited storage space available, limiting a consumer's access to the desired resource and slowing system operation. In some embodiments, resource limiter 103 may receive an indication of such a situation. If memory structure 106 is not full, then the request for permits is granted (block 609), and the method may conclude in block 608. If, however, memory structure 106 is full or has limited available storage space, then the method may depend on whether the consumer's resource use is close to that of a top offender (block 606).

As described above, the number of permits granted to the consumer during the last data horizon may be compared to the top offenders list. If the number of permits granted to the consumer is not within a threshold value of the number of permits granted to the highest-ranking consumer included in the top offenders list, then the method may proceed from block 609 as described above.

If, however, the number of permits granted to the consumer is within the threshold value of the highest ranking consumer included in the top offenders list, then the request for permits is rejected (block 607), and the method may conclude in block 608.

Figure 6:
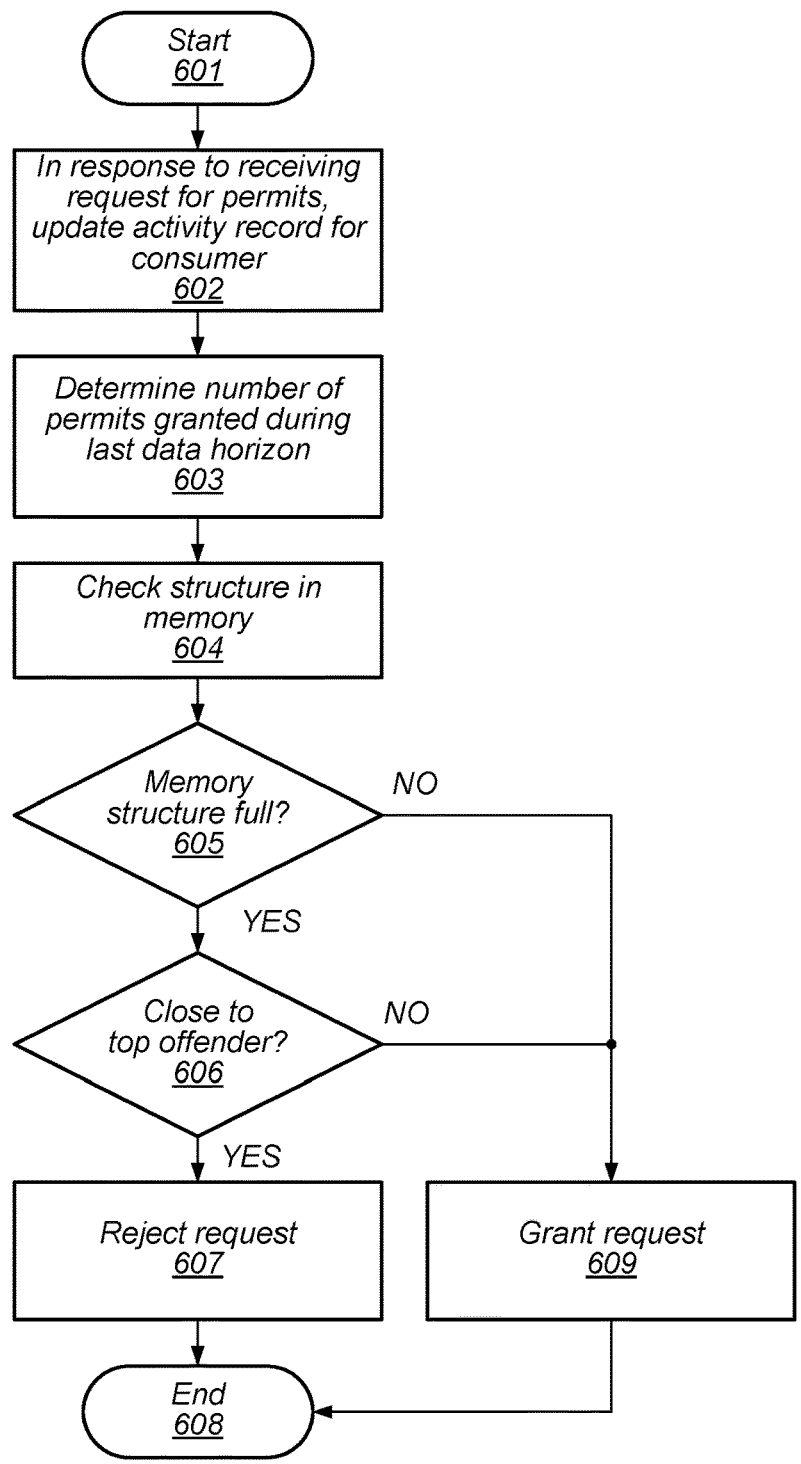
FIG. 6 illustrates a flow diagram depicting an embodiment of another method for processing request for permits for a particular resource in a computer system.

While the embodiment of the method depicted in the flow diagram of FIG. 6 relies upon the usage of memory structure 106, it is noted that, in other embodiments, different conditions may be employed to determine if a request for permits may be granted.

Figure 7:
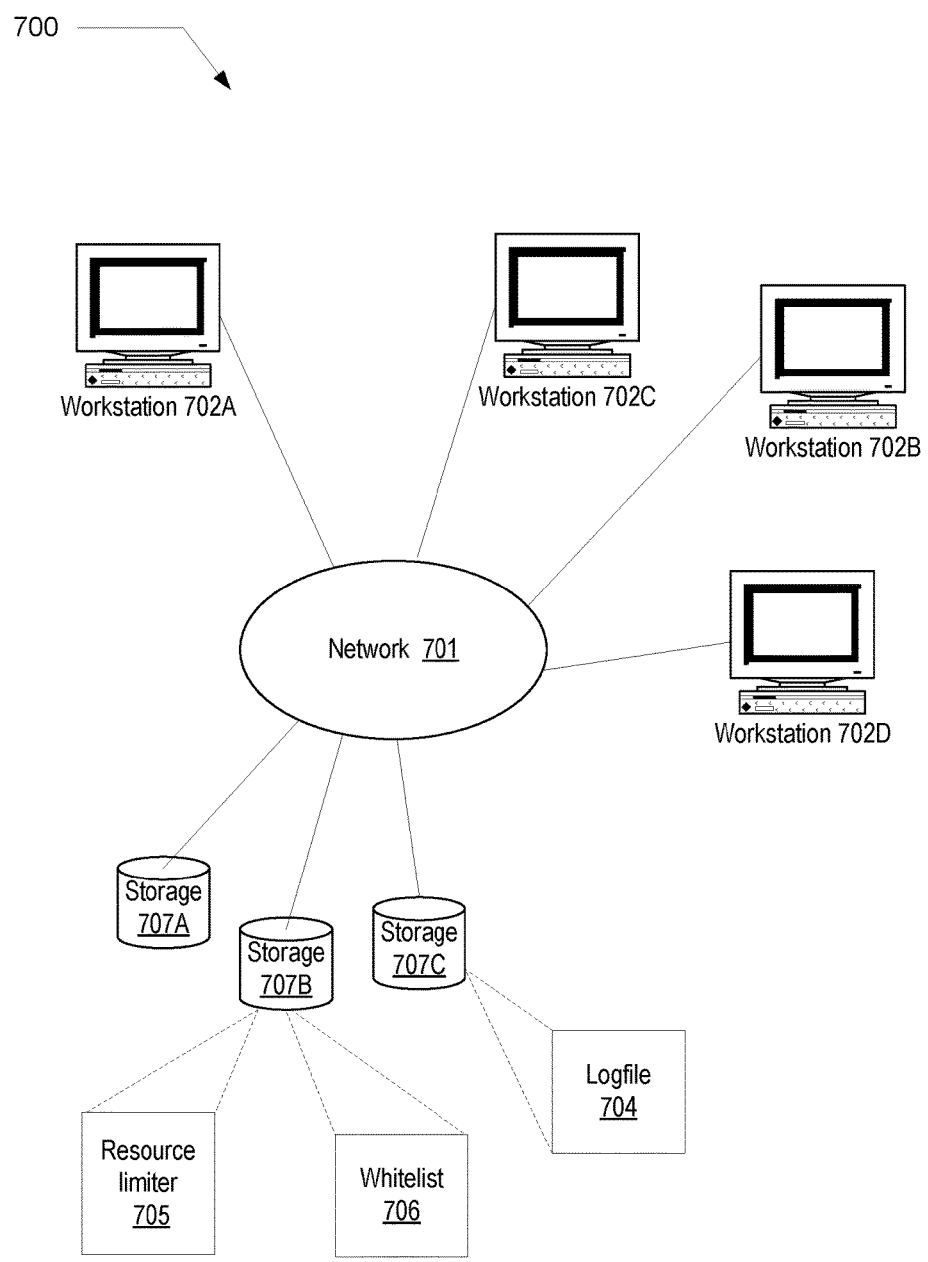
FIG. 7 is a block diagram of one embodiment of a computer system including an resource limiter tool.

Turning to FIG. 7, a block diagram of one embodiment of a computer system including a resource limiter. The computer system 700 includes a plurality of workstations designated 702A through 702D. The workstations are coupled together through a network 701 and to a plurality of storages designated 707A through 707C. In one embodiment, each of workstations 702A-702D may be representative of any standalone computing platform that may include, for example, one or more processors, local system memory including any type of random access memory (RAM) device, monitor, input output (I/O) means such as a network connection, mouse, keyboard, and the like (many of which are not shown for simplicity).

In one embodiment, storages 707A-707C may be representative of any type of mass storage device such as hard disk systems, optical media drives, tape drives, ram disk storage, and the like. As such, program instructions comprising the resource limiter may be stored within any of storages 707A-707C and loaded into the local system memory of any of the workstations during execution. As an example, as shown in FIG. 7, the resource limiter 705 is shown stored within storage 707B, while logfile 704 is stored within storage 707C. In one embodiment, resource limiter 705 may be called by any of workstations 702A-702D. The program instructions associated with resource limiter 705 may be executed directly from the removable media or transferred to the local system memory or mass storages 807 for subsequent execution. As such, the portable storage media, the local system memory, and the mass storages may be referred to as non-transitory computer readable storage mediums. The program instructions associated with resource limiter 705 may be executed by the one or more processors on a given workstation, or they may be executed in a distributed fashion among the workstations, as desired.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a computer system, at a current time point, a request for a first number of permits from a particular consumer of a plurality of consumers, wherein each permit corresponds to a specified portion of a software resource;
   comparing the requested number of permits to a total number of available permits; and
   in response to determining that the requested first number of permits is greater than the total number of available permits:
      determining that a different consumer of the plurality of consumers was granted a third number of permits during a period of time to the current time point, wherein the third number of permits is the largest number of permits granted to one of the plurality of consumers during the period of time;
      comparing a second number of permits granted to the particular consumer during the period of time to the third number of permits granted to the different consumer during the period of time prior to the current time point;
      rejecting access to the software resource by the particular consumer based on a comparison of a difference between the second number of permits and the third number of permits to a threshold value.

2. The method of claim 1, further comprising:
   receiving, by the computer system, at the current time point, a request for a fourth number of permits from another consumer of the plurality of consumers; and
   in response to determining the requested fourth number of permits is greater than the total number of available permits, granting access to the software resource to the another consumer in response to determining that the difference between the fourth and third number of permits is greater than the threshold value.

3. The method of claim 1, further comprising, granting access to the software resource by the particular consumer in response to determining the particular consumer has been previously identified as having unrestricted access to the software resource.

4. The method of claim 1, further comprising, rejecting access to the software resource by the particular consumer in response to determining the number of permits is greater than a burst threshold value.

5. The method of claim 1, further comprising, in response to receiving the request for the number of permits, updating an activity record associated with the particular consumer that includes a plurality of data points, wherein each data point of the plurality of data points includes a number of granted permits, and a time at which the number of granted permits was granted.

6. The method of claim 5, wherein updating the activity record includes deleting a particular data point of the plurality of data points in response to determining the time at which the number of granted permits included in the particular data point is older than an oldest time point of the period of time prior to the current time point.

7. A non-transitory computer-accessible storage medium having program instructions stored therein that, in response to execution by a computer system including one or more computers, cause the computer system to perform operations including:
   receiving, by a computer system, at a current time point, a request for a first number of permits from a particular consumer of a plurality of consumers, wherein each permit corresponds to a specified portion of a software resource;
   comparing the requested first number of permits to a total number of available permits; and
   in response to determining that the requested first number of permits is greater than the total number of available permits:
      determining that a different consumer of the plurality of consumers was granted a third number of permits during a period of time to the current time point, wherein the third number of permits is the largest number of permits granted to one of the plurality of consumers during the period of time;
      comparing a second number of permits granted to the particular consumer during the period of time to the third number of permits granted to the different consumer during the period of time prior to the current time point;
      rejecting access to the software resource by the particular consumer based on a comparison of a difference between the second number of permits and the third number of permits to a threshold value.

8. The non-transitory computer-accessible storage medium of claim 7, wherein the operations further include granting access to the software resource by the particular consumer in response to determining the particular consumer has been previously identified as having unrestricted access to the software resource.

9. The non-transitory computer-accessible storage medium of claim 7, wherein the operations further include rejecting access to the software resource by the particular consumer in response to determining the number of permits is greater than a burst threshold value.

10. The non-transitory computer-accessible storage medium of claim 7, wherein the operations further include, in response to receiving the request for the number of permits, updating an activity record associated with the particular consumer that includes a plurality of data points, wherein each data point of the plurality of data points includes a number of granted permits, and a time at which the number of granted permits was granted.

11. The non-transitory computer-accessible storage medium of claim 10, wherein updating the activity record includes deleting a particular data point of the plurality of data points in response to determining the time at which the number of granted permits included in the particular data point is older than an oldest time point of the period of time prior to the current time point.

12. The non-transitory computer-accessible storage medium of claim 7, wherein the operations further include rejecting access to the software resource by the particular consumer in response to determining available storage in a memory structure associated with the software resource is less than a storage threshold value.

13. The non-transitory computer-accessible storage medium of claim 7, wherein the resource unit of the software resource corresponds to a character included in a log file.

14. A method, comprising:
receiving, by a computer system, at a current time point, a request for a first number of permits from a particular consumer of a plurality of consumers, wherein each permit corresponds to a specified portion of a software resource;
comparing the requested first number of permits to a total number of available permits; and
in response to determining that the requested first number of permits is greater than the total number of available permits:
determining that a different consumer of the plurality of consumers was granted a third number of permits during a period of time to the current time point, wherein the third number of permits is the largest number of permits granted to one of the plurality of consumers during the period of time;
comparing a second number of permits granted to the particular consumer during the period of time to the third number of permits granted to the different consumer during the period of time prior to the current time point;
in response to determining that a difference between the second number of permits and the third number of permits is less than a threshold value, rejecting access to the software resource by the particular consumer.

15. The method of claim 14, wherein the operations further include granting access to the software resource by the particular consumer in response to determining the particular consumer has been previously identified as having unrestricted access to the software resource.

16. The method of claim 14, wherein the operations further include rejecting access to the software resource by the particular consumer in response to determining the number of permits is greater than a burst threshold value.

17. The method of claim 14, wherein the operations further include, in response to receiving the request for the number of permits, updating an activity record associated with the particular consumer that includes a plurality of data points, wherein each data point of the plurality of data points includes a number of granted permits, and a time at which the number of granted permits was granted.

18. The method of claim 17, wherein updating the activity record includes deleting a particular data point of the plurality of data points in response to determining the time at which the number of granted permits included in the particular data point is older than an oldest time point of the period of time prior to the current time point.

19. The method of claim 14, wherein the operations further include rejecting access to the software resource by the particular consumer in response to determining available storage in a memory structure associated with the software resource is less than a storage threshold value.

20. The method of claim 14, wherein the resource unit of the software resource corresponds to a character included in a log file.

* * * * *